A. K. GILE.
Cranberry-Rake.

No. 203,538. Patented May 14, 1878.

WITNESSES.

INVENTOR.
Albion K Gile
per William Edson Atty.

UNITED STATES PATENT OFFICE.

ALBION K. GILE, OF ALFRED, MAINE.

IMPROVEMENT IN CRANBERRY-RAKES.

Specification forming part of Letters Patent No. 203,538, dated May 14, 1878; application filed September 14, 1876.

*To all whom it may concern:*

Be it known that I, ALBION K. GILE, of Alfred, in the county of York and State of Maine, have invented an Improvement in Cranberry-Rakes, of which the following is a specification:

The nature of my invention consists in the novel construction of a rake with one set of teeth arranged at, or about at, right angles with the handle, and with another set at, or about at, an angle of one hundred and thirty-five degrees with the first set and with the handle, for the purpose hereinafter described.

Figure 1:
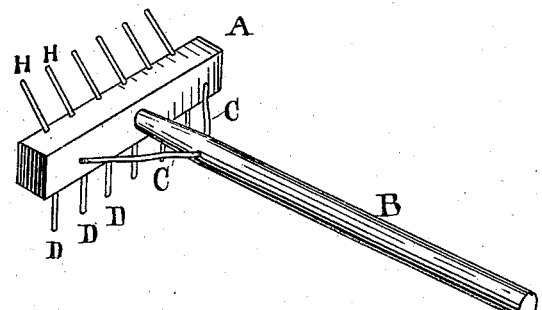
Figure 2:
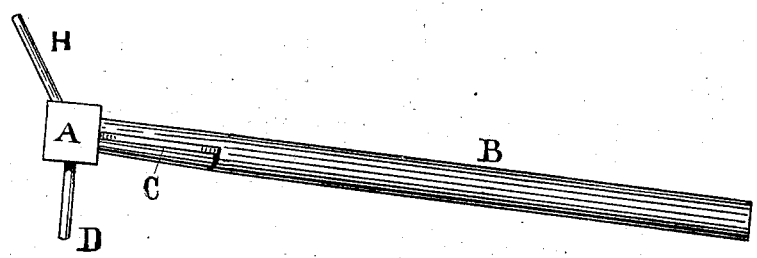

In the drawings, Figure 1 is a perspective view of my invention, and Fig. 2 shows the same in section.

The handle B, braces C C, and head A may be made of any desired pattern and of any suitable material. In this head A a set of ordinary teeth are inserted at, or about at, right angles with the handle B. On the opposite side of the head A a set of teeth, H H, are set at, or about at, an angle of one hundred and thirty-five degrees with the first set and with the handle, all as clearly shown in the drawings.

The rake thus constructed is specially adapted for gathering cranberries, and answers a double purpose. By turning the inclined teeth downward it is used to depress the vines and expose the berries without injury to either. When this is done the rake is turned over, and, with the opposite set of teeth downward is used to gather the berries.

Having thus described my invention, what I claim is—

As an improved manufacture, the cranberry-rake, substantially as described, having one set of teeth arranged at, or about at, right angles with the handle, and the other set at, or about at, an angle of a hundred and thirty-five degrees with the first set and the handle, all being essentially as shown.

ALBION K. GILE.

Witnesses:
NATHL. EVANS,
WILLIAM EDSON.